(12) United States Patent
Cheng et al.

(10) Patent No.: US 11,059,540 B2
(45) Date of Patent: Jul. 13, 2021

(54) FOLDABLE BICYCLE AND METHOD FOR FOLDING THE SAME

(71) Applicants: Pao-Hsien Cheng, Tainan (TW); Chun-Shuo Cheng, Tainan (TW)

(72) Inventors: Pao-Hsien Cheng, Tainan (TW); Chun-Shuo Cheng, Tainan (TW)

(*) Notice: Subject to any disclaimer, the term of this patent is extended or adjusted under 35 U.S.C. 154(b) by 342 days.

(21) Appl. No.: 16/158,700

(22) Filed: Oct. 12, 2018

(65) Prior Publication Data
US 2020/0115000 A1 Apr. 16, 2020

(51) Int. Cl.
*B62K 15/00* (2006.01)
*B62K 21/24* (2006.01)
*B62M 9/02* (2006.01)

(52) U.S. Cl.
CPC .......... *B62K 15/006* (2013.01); *B62K 15/008* (2013.01); *B62K 21/24* (2013.01); *B62K 2015/001* (2013.01); *B62M 9/02* (2013.01)

(58) Field of Classification Search
CPC .... B62K 15/00; B62K 15/006; B62K 15/008; B62K 2015/001; B62K 3/10; B62K 19/18; B62K 21/18; B62K 21/24
See application file for complete search history.

(56) References Cited

U.S. PATENT DOCUMENTS

| | | | | |
|---|---|---|---|---|
| 5,052,706 A | * | 10/1991 | Tsai | B62K 15/006 280/287 |
| 6,267,401 B1 | * | 7/2001 | De Jong | B62K 15/008 280/287 |
| 8,528,928 B1 | * | 9/2013 | Kim | B62K 15/006 280/287 |
| 8,602,436 B2 | * | 12/2013 | Montero Basqueseaux | B62K 15/008 280/278 |
| 8,801,022 B2 | * | 8/2014 | Song | B62M 6/65 280/278 |
| 9,205,889 B2 | * | 12/2015 | Paick | B62M 6/45 |
| 2011/0109059 A1 | | 5/2011 | Dumaresq | |
| 2011/0305502 A1 | * | 12/2011 | Lo | B62K 15/006 403/84 |

(Continued)

FOREIGN PATENT DOCUMENTS

CN 103144723 A 6/2013
CN 203698545 U 7/2014
(Continued)

OTHER PUBLICATIONS

Patent Search Report Issued by a Foreign Patent Office in Application No. 107132678.
(Continued)

*Primary Examiner* — Minnah L Seoh
*Assistant Examiner* — Maurice L Williams
(74) *Attorney, Agent, or Firm* — Rosenberg, Klein & Lee

(57) ABSTRACT

A foldable bicycle is disclosed herein which can be unlocked to fold. It comprises a main frame having a first connecting rod and a second connecting rod, a first folding joint between the first connecting rod and the second connecting rod and having a first outer shell, a second outer shell, an engaging unit, an elastic member, a press button and a cam locking member, a front wheel rack connected to a front end of the first connecting rod, a front wheel connected to the front wheel rack, and a rear wheel connected to a rear end of the second connecting rod.

8 Claims, 15 Drawing Sheets

(56) References Cited

U.S. PATENT DOCUMENTS

| | | | |
|---|---|---|---|
| 2013/0087989 A1* | 4/2013 | Beistegui Chirapozu | ................... B62K 3/10 280/287 |
| 2014/0076649 A1 | 3/2014 | Kim et al. | |
| 2019/0061862 A1* | 2/2019 | Thompson | ............. B62K 15/00 |

FOREIGN PATENT DOCUMENTS

| | | |
|---|---|---|
| CN | 204548347 U | 8/2015 |
| CN | 104843123 B | 7/2018 |
| TW | M399080 U | 1/2011 |
| TW | M399082 U1 | 3/2011 |
| TW | I385101 B1 | 2/2013 |
| WO | 9321055 A1 | 10/1993 |

OTHER PUBLICATIONS

Notice of Allowance Issued by a Foreign Patent Office in Application No. 107132678.

Patent Search Report Issued by a Foreign Patent Office in International Application No. 102018126124.1.

\* cited by examiner

FOLDABLE BICYCLE AND METHOD FOR FOLDING THE SAME

BACKGROUND OF THE INVENTION

1. Field of the Invention

The present invention relates to a foldable bicycle and a method for folding the same which has a pair of folding joints for rotating obliquely relative to each other so as to achieve efficacy of reducing volume by folding a front wheel and a rear wheel along an oblique junction to the corresponding side-by-side position.

2. Description of Related Art

The Taiwan Patent Publication No. TW 1385101 (B), issued on 11 Feb. 2013, has disclosed a folding bicycle frame and a folding bicycle. The folding technique includes folding the front frame towards the rear frame by the first pivot axis and rotating the rear-wheel support assembly by the second pivot axis relative to the rear frame to adjust the relative position of the rear-wheel support assembly and the front frame. That is to adjust the relative position of the rear wheel and the front wheel to reduce the volume of the bicycle for easily storing. However, the structure cannot be pushed to move after its frames are folded completely. If the structure needs to be moved, the entire frames must be lifted, which is quite inconvenient to use.

The China Patent Publication No. CN 104843123 (B), issued on 6 Jul. 2018, has disclosed a V-shaped type of folding bicycle. The fork assembly is interlocked with the upper end of the rear frame component by the shaft, and the shaft is provided with the folding mechanism to lock the fork assembly and the rear frame assembly or to perform relative rotation on the shaft. Although the abovementioned bicycle frame has two folding modes, the two folding modes are not continuous and only one of the folding modes can be selected at a time, so the operation is complicated.

The Taiwan Patent Publication No. M399082 (U), issued on 1 Mar. 2011, has disclosed a folding bicycle frame. It comprises a rear tripod rotating shaft, a front frame disposed on the rear tripod rotating shaft, and a head. The rear tripod rotating shaft has a rear tripod and a rotating shaft connected to the front end of the rear tripod. The front frame has a pivot tube for rotating in the rotating shaft so that the front frame can be rotated relative to the rear tripod. The head has a positioning device which is disposed at the top of the front end of the front frame, so the rear tripod and the front frame can be folded together. However, the front wheel and the rear wheel are not parallel to each other or arranged side by side in the folding state. Furthermore, there is an included angle between the front wheel and the rear wheel, so the bicycle cannot be pushed to move after it is completely folded. If the bicycle needs to be moved, the entire frames must be lifted, which is quite inconvenient to use.

SUMMARY OF THE INVENTION

In view of the above-mentioned problems, the object of the present invention is to provide a foldable bicycle which can be easily carried and stored with a reduced volume.

Disclosed herein is a foldable bicycle. It comprises a main frame having a first connecting rod and a second connecting rod, a first folding joint between the first connecting rod and the second connecting rod, a front wheel rack connected to a front end of the first connecting rod, a front wheel connected to the front wheel rack, and a rear wheel connected to a rear end of the second connecting rod.

The first folding joint is provided with a first outer shell connected to a rear end of the first connecting rod, a second outer shell connected to a front end of the second connecting rod for further connecting the first outer shell, an engaging unit accommodated in a space defined by the first outer shell and the second outer shell being joined together, an elastic member disposed between the engaging unit and the second outer shell, a press button having a pushing lever for inserting from an outside of the first outer shell to an interior of the first outer shell to contact the engaging unit, and a cam locking member for positioning the first outer shell, the engaging unit and the second outer shell all coaxial to another in a first axial direction and for controlling tightness between the first outer shell and the second outer shell. The first outer shell is formed by a first lateral wall and a first annular wall surrounding a periphery of the first lateral wall and having a first height and a second height. The second outer shell is formed by a second lateral wall and a second annular wall surrounding a periphery of the second lateral wall and having a first height and a second height. The first height of the first annular wall correspondingly connects with the second height of the second annular wall, and the second height of the first annular wall correspondingly connects with the first height of the second annular wall, so as further to form an oblique junction between the first and second annular walls.

The front wheel is arranged in a second axial direction parallel to an axis of the front wheel, and the rear wheel is arranged in the second axial direction parallel to an axis of the rear wheel. The second axial direction is obliquely oriented relative to the first axial direction at an included angle.

According to an embodiment of the present invention, an external surface of the first outer shell is provided with a capacity tank for accommodating the press button and a perforation disposed in the capacity tank for insertion of the pushing lever of the press button.

According to an embodiment of the present invention, a second folding joint is provided on a top end of the front wheel rack and a handlebar stem is further connected with the second folding joint, so the handlebar stem is bent downwardly to lean against a lateral side of the front wheel rack as the second folding joint stays in an unlocking state.

A method for folding a foldable bicycle as described above, comprising the steps of: unlocking a first folding joint fitted on a main frame between a front wheel and a rear wheel; rotating the first folding joint in a first axial direction to form an included angle between the first axial direction and a second axial direction obliquely oriented relative to the first axial direction, wherein the second axial direction is parallel to axes of the front and rear wheels; and folding the main frame by the first folding joint to make the front and rear wheels parallel to each other.

According to an embodiment of the present invention, it further comprises the step of downwardly bending a handlebar stem about an axis of a folding shaft part of a second folding joint by unlocking the second folding joint fitted between a front wheel rack and the handlebar stem, wherein the handlebar stem is connected with the second folding joint pivoted on a top end of the front wheel rack.

According to an embodiment of the present invention, further comprises the step of rotating the front wheel rack about an axis of a connection between a front end of the main frame and the front wheel rack in a clockwise or counterclockwise direction to allow the front wheel rack directing forward to backward before the step of folding the main frame.

The engaging unit is disposed on the oblique junction to engage with the first outer shell and the second outer shell to lock the first folding joint. When the press button is pressed, its pushing lever pushes the engaging unit to move towards the second outer shell until it is detached from the first outer shell. After the first folding joint is unlocked, the first folded joint can be rotated in the first axial direction as the axis for folding. During the folding process, the first outer shell and the second outer shell are rotated along the oblique junction, and the main frame is folded until the front wheel and the rear wheel are arranged side by side.

The design of the first folding joint, the second folding joint, and the oblique junction allows the front wheel and the rear wheel that are originally arranged on a same line to stagger from each other during the folding process. Therefore, the front wheel and the rear wheel can be arranged parallel to each other after the main frame is completely folded, which is convenient for a user to take the bicycle.

Furthermore, the front wheel disposed on the front wheel rack can be arranged parallel to the rear wheel by not-turning or turning the handlebar stem to bring the front wheel rack to rotate backwards.

DETAILED DESCRIPTION OF THE PREFERRED EMBODIMENT

Figure 1:
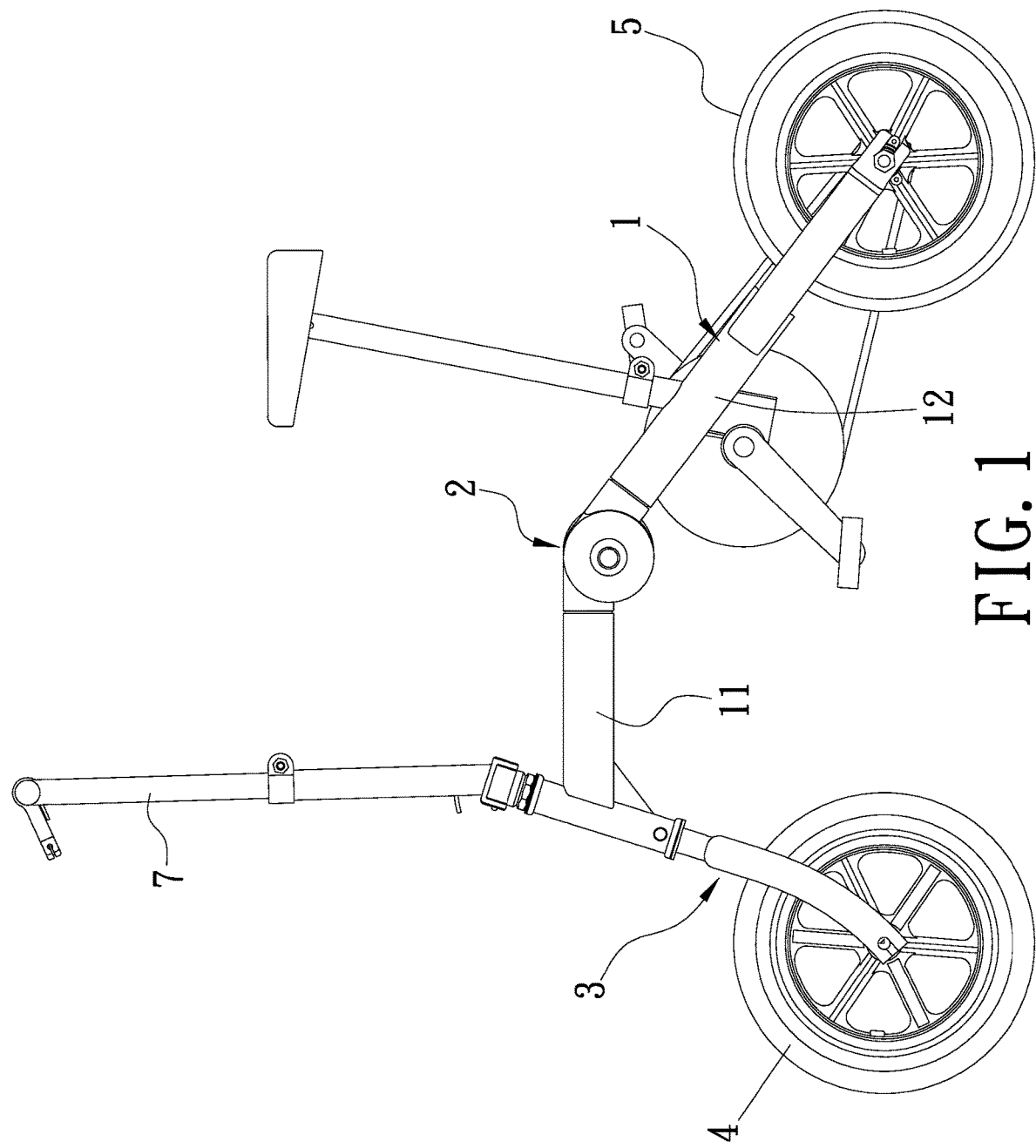
FIG. 1 is a lateral view showing a foldable bicycle according to the present invention.

Hereinafter, an exemplary embodiment of the present invention will be described in detail with reference to the accompanying drawings.

As showed in FIG. 1 to FIG. 6, a foldable bicycle according to the present invention is disclosed herein. It mainly comprises a main frame (1), a first folding joint (2), a front wheel rack (3), a front wheel (4) and a rear wheel (5).

The main frame (1) comprises a first connecting rod (11) and a second connecting rod (12). The first folding joint (2) is disposed between the first connecting rod (11) and the second connecting rod (12). The front wheel rack (3) is connected to a front end of the first connecting rod (11). The front wheel (4) is connected to the front wheel rack (3) and arranged in a second axial direction (L1) parallel to an axis of the front wheel (4). The rear wheel (5) is connected to a rear end of the second connecting rod (12) and arranged in the second axial direction (L1) parallel to an axis of the rear wheel (5).

The first folding joint (2) comprises a first outer shell (21), a second outer shell (22), an engaging unit (23), an elastic member (24), a press button (25) and a cam locking member (26). The first outer shell (21) is connected to a rear end of the first connecting rod (11). The second outer shell (22) is connected to a front end of the second connecting rod (12) for further connecting the first outer shell (21). The the first outer shell (21) is formed by a first lateral wall (211) and a first annular wall (212) surrounding a periphery of the first lateral wall (211) and having a first height and a second height. The second outer shell (22) is formed by a second lateral wall (221) and a second annular wall (222) surrounding a periphery of the second lateral wall (221) and having a first height and a second height. The first height of the first annular wall (212) correspondingly connects with the second height of the second annular wall (222), and the second height of the first annular wall (212) correspondingly connects with the first height of the second annular wall (222), so as further to form an oblique junction (S1) between the first and second annular walls (212) (222).

The engaging unit (23) is accommodated in a space defined by the first outer shell (21) and the second outer shell (22) being joined together.

The elastic member (24) is disposed between the engaging unit (23) and the second outer shell (22).

The press button (25) is disposed on an outside of the first outer shell (21) and provided with a pushing lever (251) for inserting from a perforation (213) on the outside of the first outer shell (21) to an interior of the first outer shell (21) to contact the engaging unit (23).

The cam locking member (26) positions the first outer shell (21), the engaging unit (23) and the second outer shell (22) all coaxial to another in a first axial direction (L2) and controls tightness between the first outer shell (21) and the second outer shell (22) by a long radius and a short radius of its cam.

The second axial direction (L1) is obliquely oriented relative to the first axial direction (L2) at an included angle (θ). The engaging unit (23) is disposed on the oblique junction (S1) to engage with the first outer shell (21) and the second outer shell (22).

Referring to FIG. 2 to FIG. 5, as the foldable bicycle stays in an unfolding state, the cam locking member (26) contacts an external side of the second outer shell (22) by the long radius of its cam so that the first outer shell (21) is tightly assembled to the second outer shell (22). In such a case, the engaging unit (23) is elastically pushed against by the elastic member (24) and located on the oblique junction (S1) between the first outer shell (21) and the second outer shell (22) to engage with the first outer shell (21) and the second outer shell (22). Accordingly, the first folding joint (2) stays in a locking state, and the foldable bicycle is fixedly expanded and cannot be folded.

Figure 6:
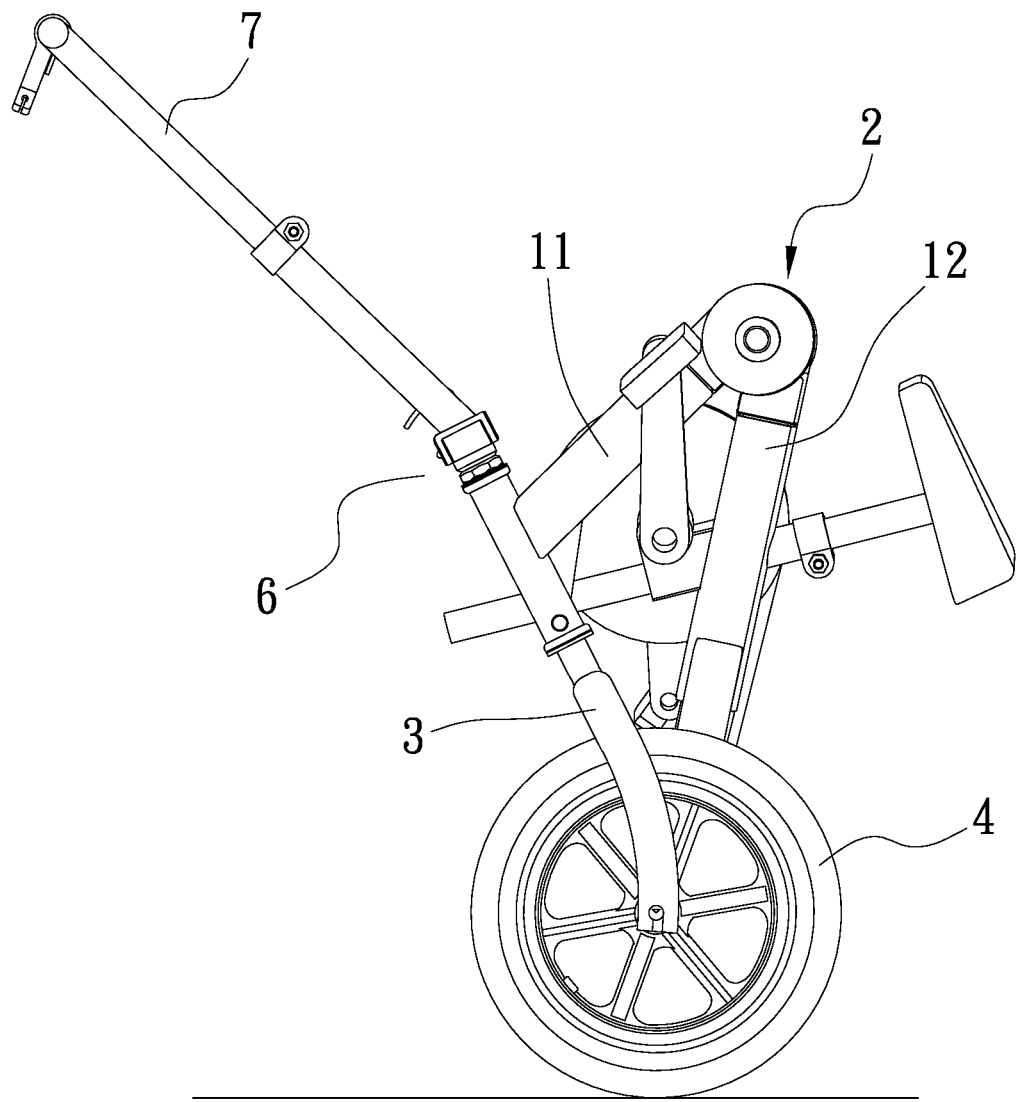
FIG. 6 is a schematic diagram showing a state of folding a first folding joint according to the present invention.

Referring to FIG. 2 to FIG. 5, for folding the main frame (1) of the foldable bicycle, the cam locking member (26) is firstly pulled so as to contact the external side of the second outer shell (22) by the short radius of its cam instead of the long radius, resulting in the first outer shell (21) loosening the second outer shell (22). Then, the press button (25) is pressed to drive its pushing lever (251) to push the engaging unit (23) to move towards the second outer shell (22) until the engaging unit (23) is completely accommodated in the second outer shell (22) and detached from the first outer shell (21). In such a case, the first folding joint (2) is unlocked, and the first folded joint (2) can be rotated in the first axial direction (L2) as the axis for folding. During the folding process, the first outer shell (21) and the second outer shell (22) are rotated along the oblique junction (S1), and the main frame (1) is folded until the front and rear wheels (4) (5) parallel to each other as shown in FIG. 6.

According to the abovementioned structure, the present invention also provides a method for folding the foldable bicycle. It comprises the steps of: unlocking the first folding joint (2) fitted on the main frame (1) between the front wheel (4) and the rear wheel (5); rotating the first folding joint (2) in the first axial direction (L2) to form the included angle (θ) between the first axial direction (L2) and the second axial direction (L1) obliquely oriented relative to the first axial direction (L2); and folding the main frame (1) by the first folding joint (2) to make the radial direction of the front and rear wheels (4) (5) not in the same plane and make the front and rear wheels (4) (5) parallel to each other. The second axial direction (L1) is parallel to axes of the front and rear wheels (4) (5). Preferably, the front and rear wheels (4) (5) are coaxial. In the folding state of the foldable bicycle, a handlebar stem (7) connected with a second folding joint (6) pivoted on a top end of the front wheel rack (3) can be used to push the folded bicycle to move as shown in FIG. 6.

Referring to FIG. 12 to FIG. 15, before the step of folding the main frame (1), the front wheel rack (3) is rotated about an axis of a connection between a front end of the main frame (1) and the front wheel rack (3) in a clockwise or counterclockwise direction to allow the front wheel rack (3) directing forward to backward. In such folding state, the handlebar stem (7) connected with the second folding joint (6) pivoted on the top end of the front wheel rack (3) can be used to push the folded bicycle to move.

Figure 7:
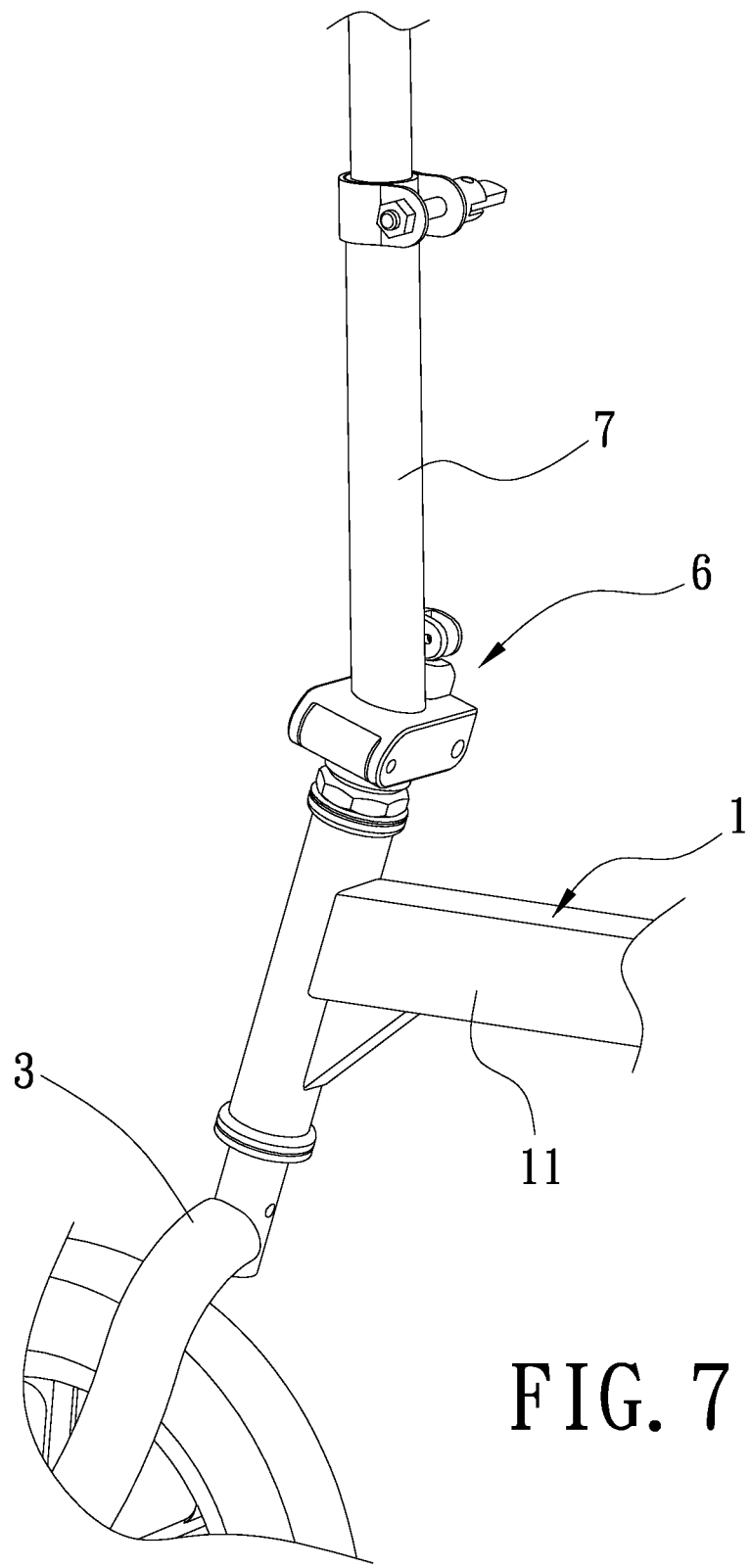
FIG. 7 is a stereogram showing a handlebar stem, a second folding joint and a front wheel rack of a first embodiment for a foldable bicycle according to the present invention.
Figure 8:
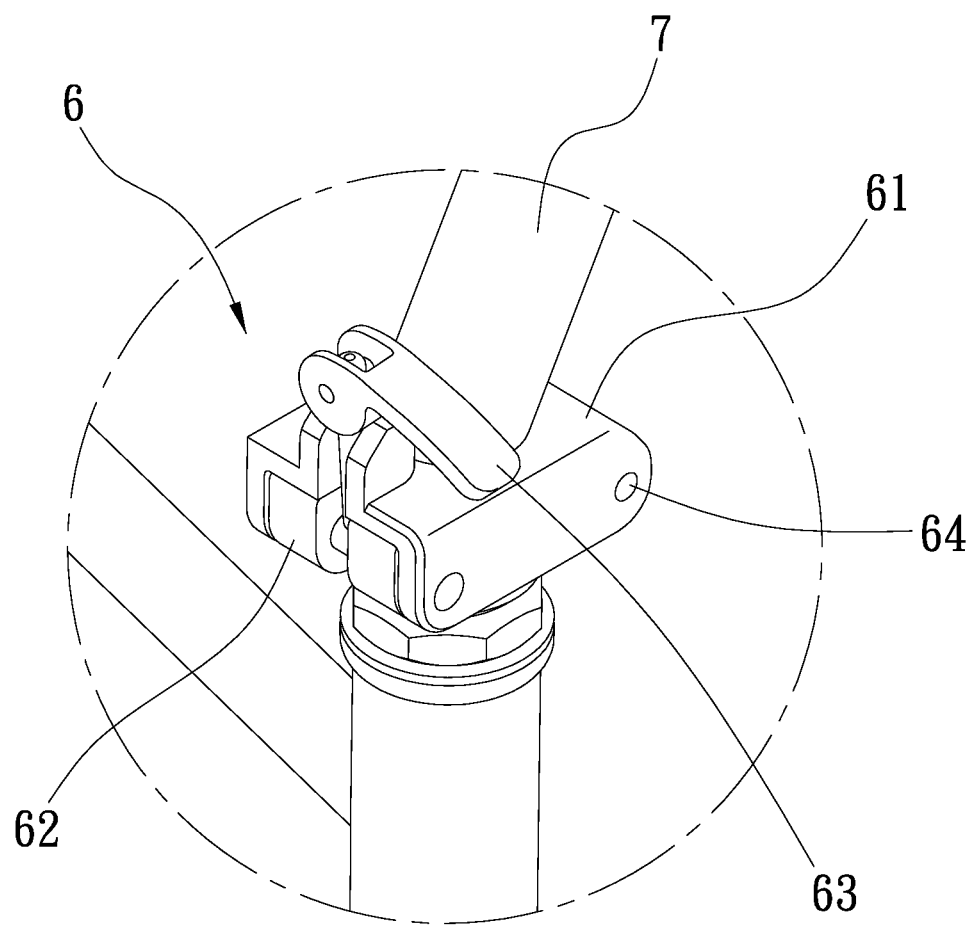
FIG. 8 is a stereogram showing a second folding joint according to the present invention.
Figure 9:
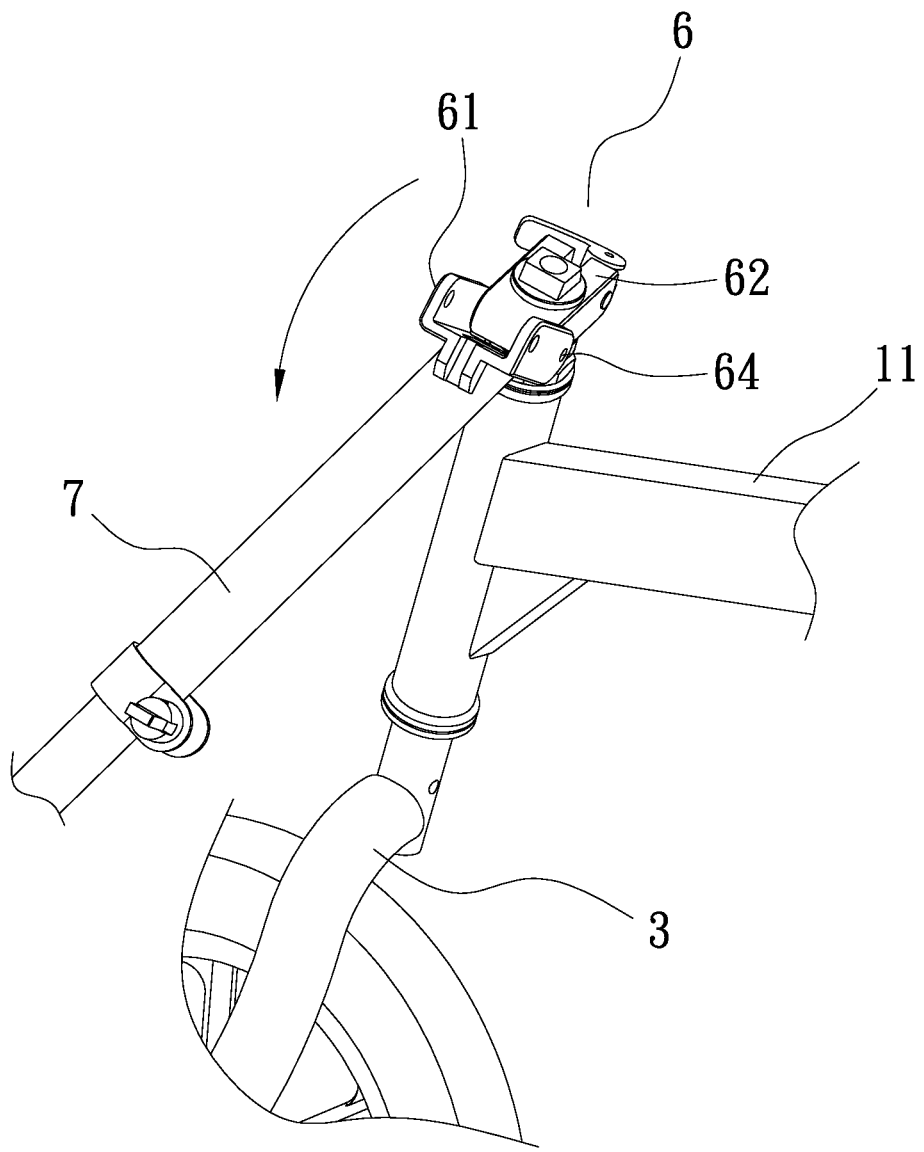
FIG. 9 is a schematic diagram showing a state of folding a second folding joint according to the present invention.
Figure 10:
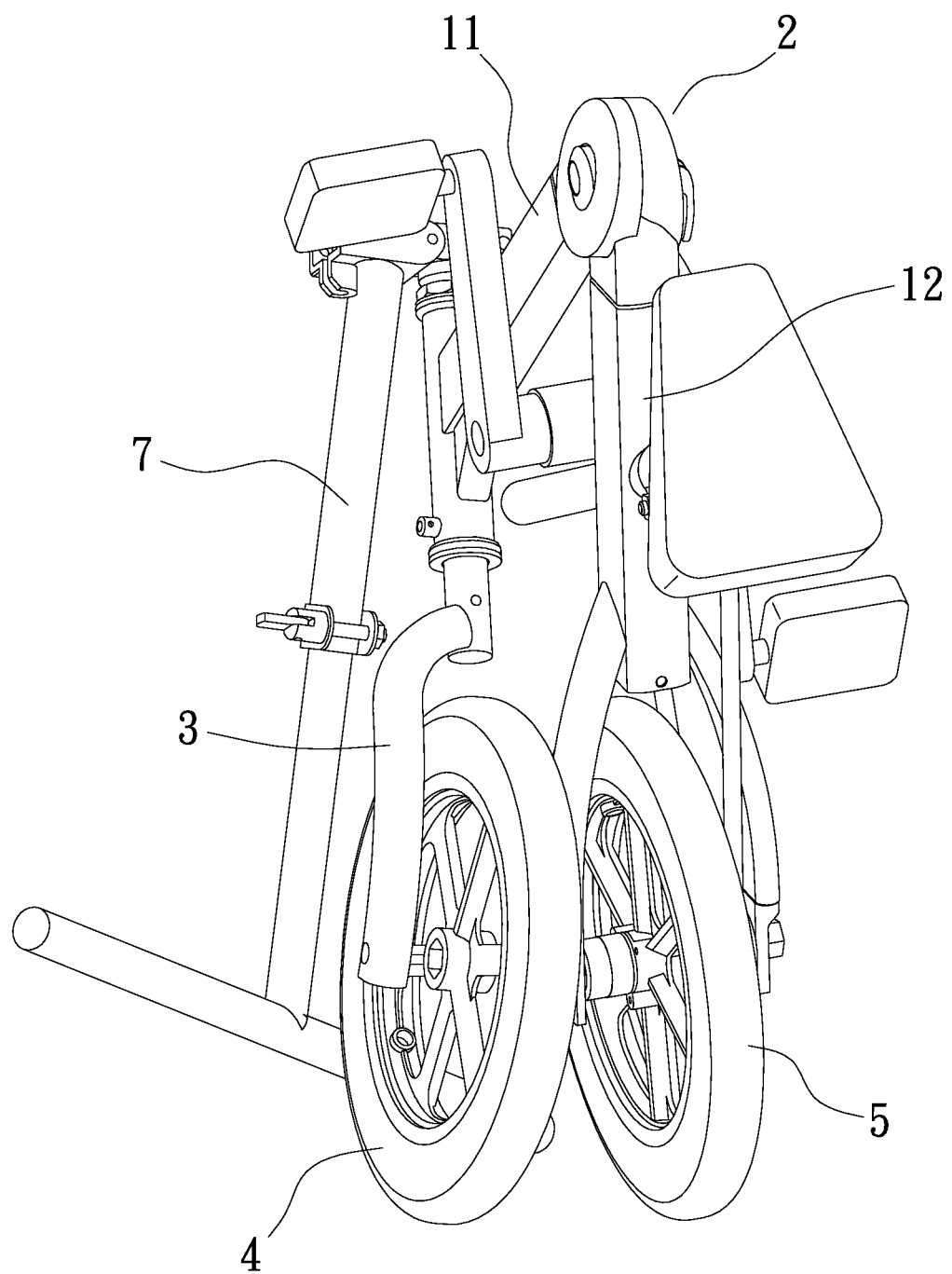
FIG. 10 is a schematic diagram showing a complete folding of a foldable bicycle according to the present invention.
Figure 11:
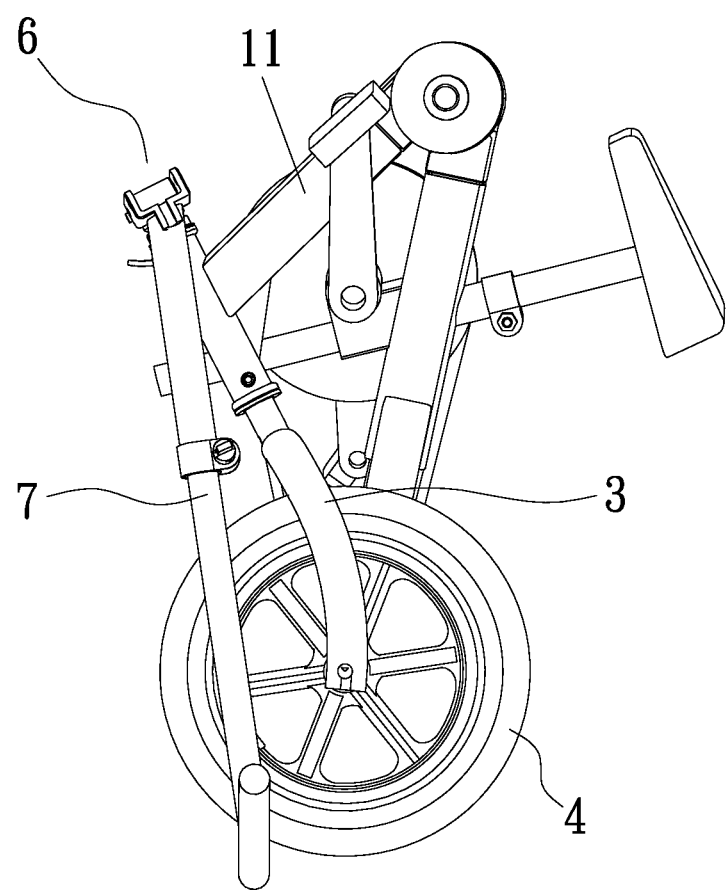
FIG. 11 is a lateral view showing the complete folding of the foldable bicycle according to the present invention.
Figure 12:
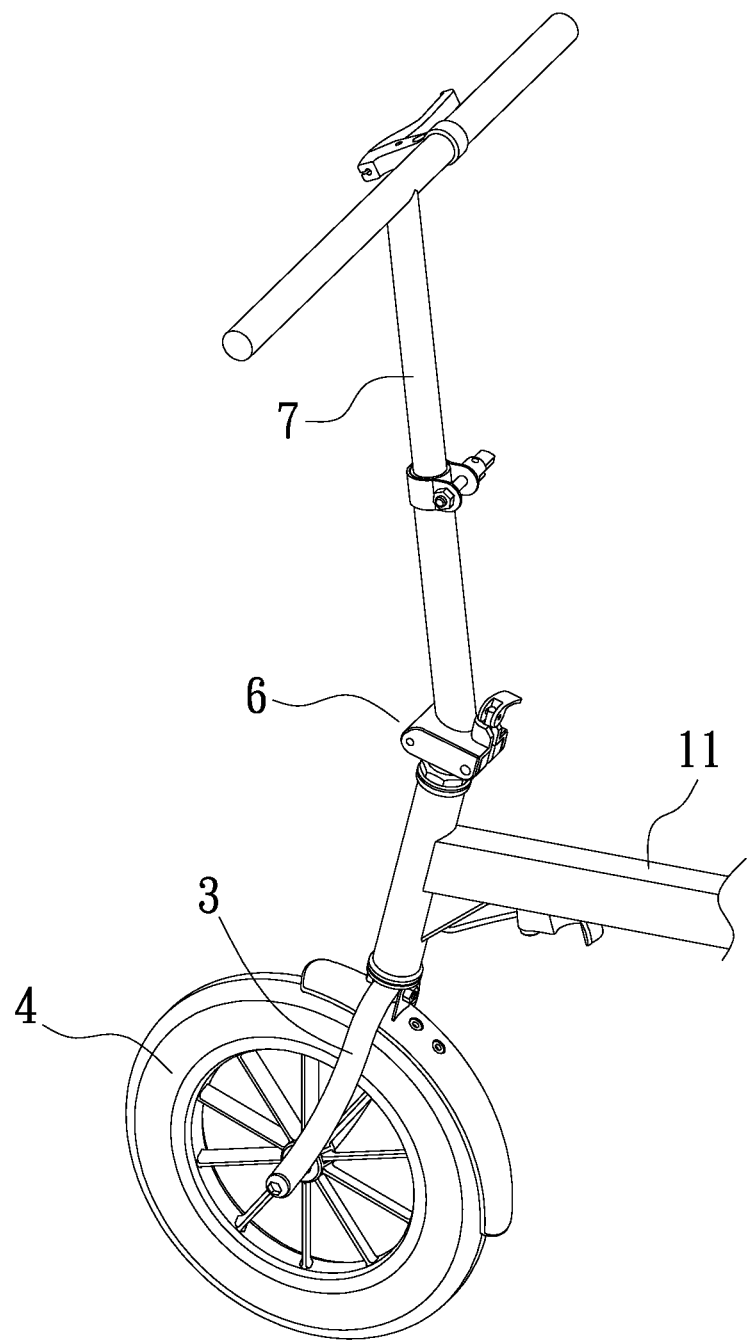
FIG. 12 is a stereogram showing a handlebar stem, a second folding joint and a front wheel rack of a second embodiment for a foldable bicycle according to the present invention.
Figure 13:
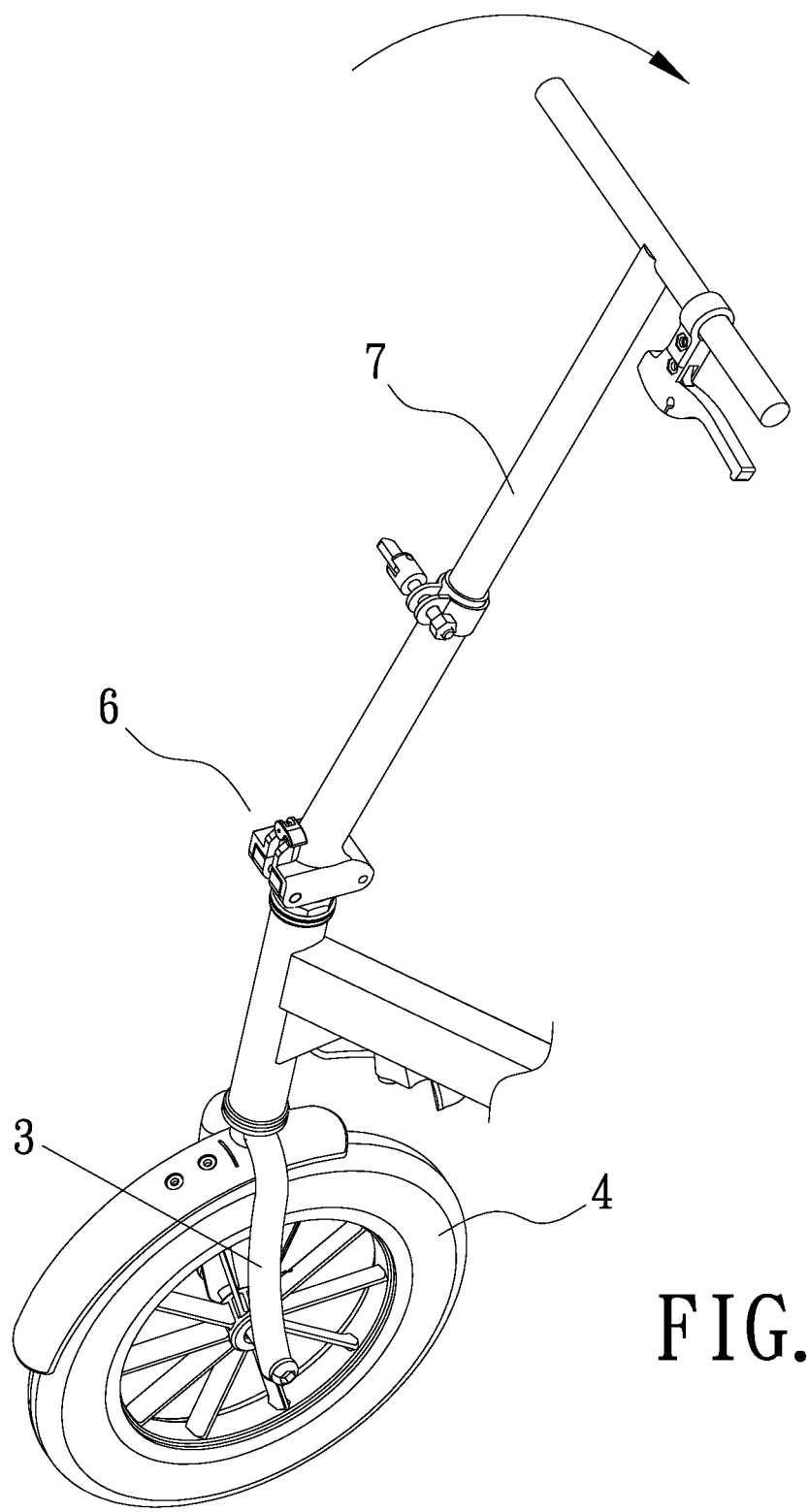
FIG. 13 is a stereogram showing the handlebar stem of the second embodiment for the foldable bicycle according to the present invention.
Figure 14:
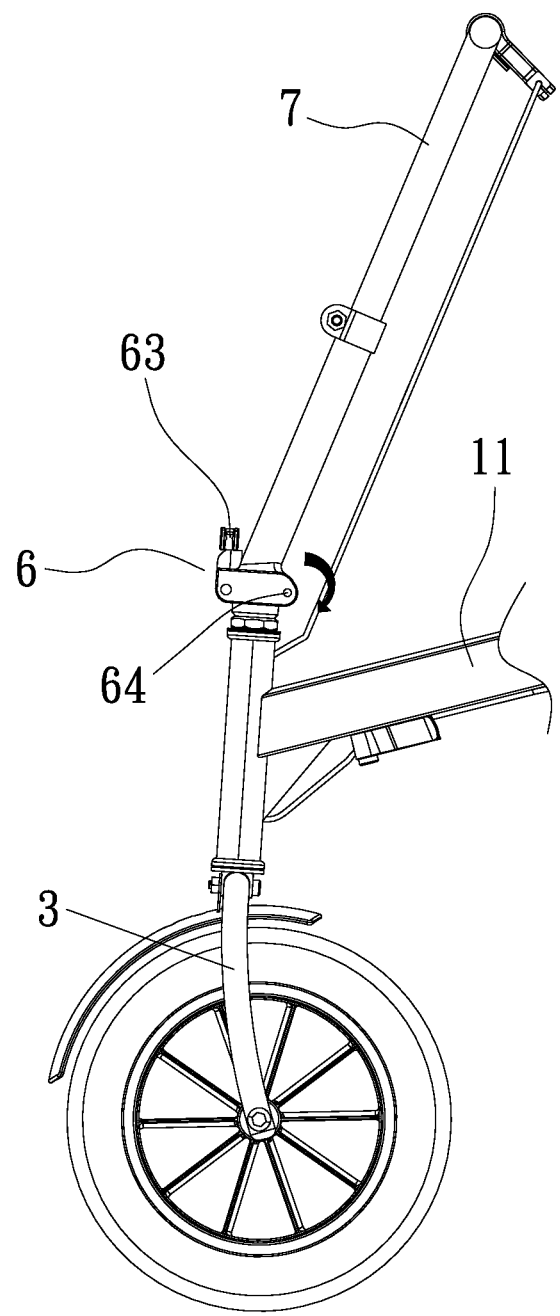
FIG. 14 is a lateral view showing the handlebar stem folded from the second folding joint of the second embodiment for the foldable bicycle according to the present invention.
Figure 15:
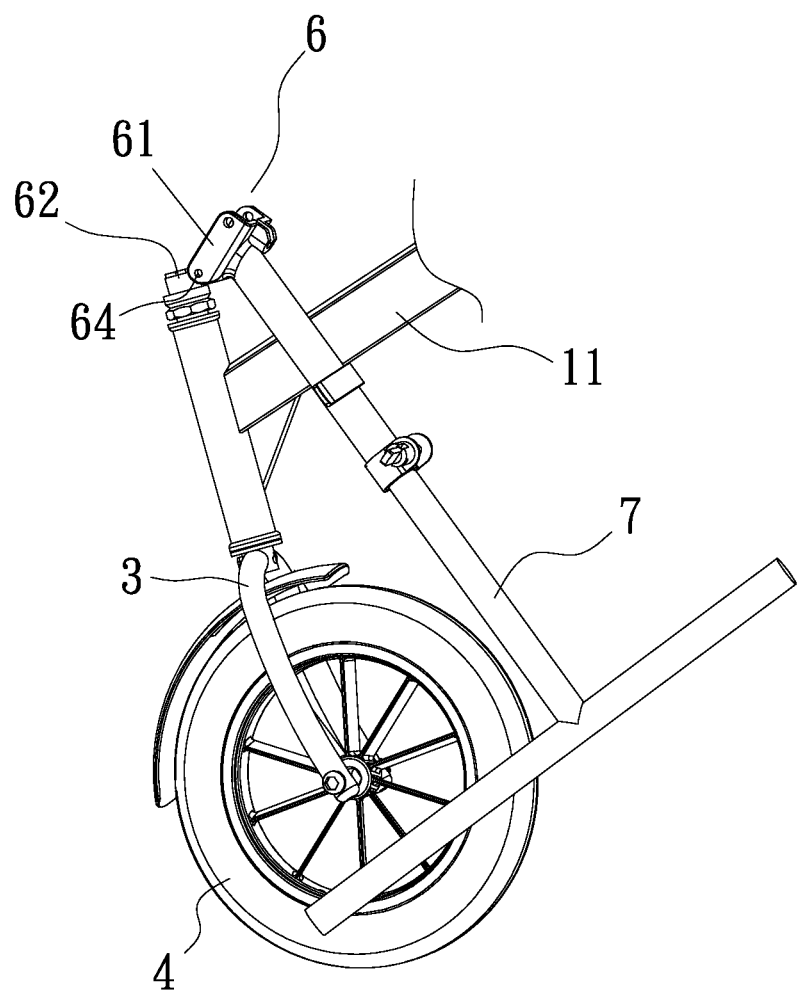
FIG. 15 is a lateral view showing a complete folding of the handlebar stem of the second embodiment for the foldable bicycle according to the present invention.

Referring to FIG. 7 and FIG. 8, the second folding joint (6) comprises a upper seat (61), a lower seat (62), a unlock control element (63) disposed on a first side of the upper seat (61), and a folding shaft part (64) disposed on second sides of the upper seat (61) and the lower seat (62). When the unlock control element (63) is locked on a first side of the lower seat (62) as shown in FIG. 1 and FIG. 7, the upper seat (61) and the lower seat (62) are joined together. In such a case, a user can control a forward direction of the front wheel (4) by controlling the handlebar stem (7). After the unlock control element (63) is unlocked, the handlebar stem (7) can be downwardly bent about an axis of the folding shaft part (64) of the second folding joint (6) as shown in FIG. 9 to FIG. 11.

For storing the foldable bicycle, the handlebar stem (7) is further folded as shown in FIG. 8 to FIG. 11 so as to reduce the volume and the occupied space. After the main frame (1) is folded, the handlebar stem (7) is further bent downwardly about the axis of the folding shaft part (64) of the second folding joint (6) by unlocking the second folding joint (6) fitted between the front wheel rack (3) and the handlebar stem (7) so as to lean against a lateral side of the front wheel rack (3).

Figure 2:
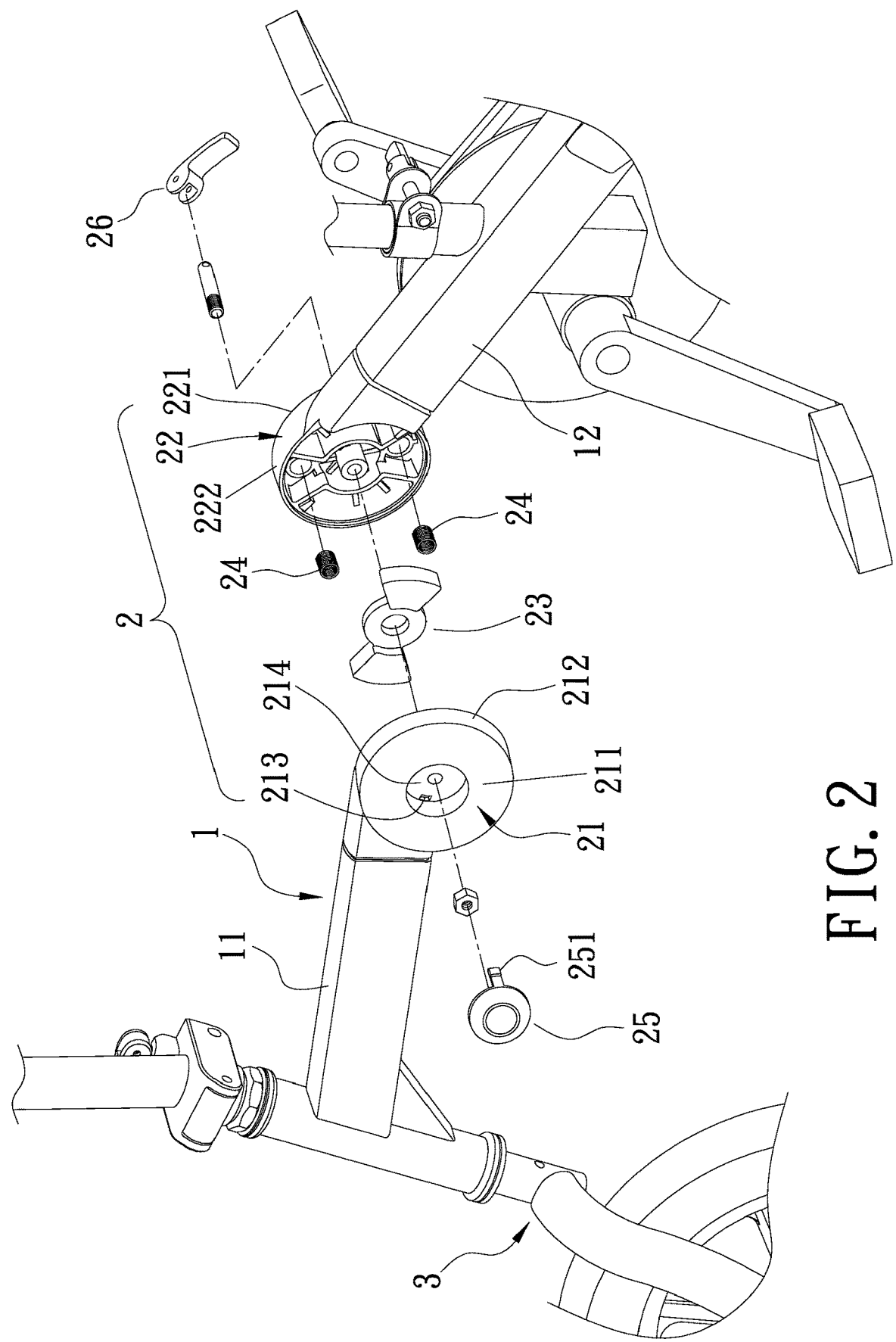
FIG. 2 is an explosion diagram showing a foldable bicycle according to the present invention.
Figure 3:
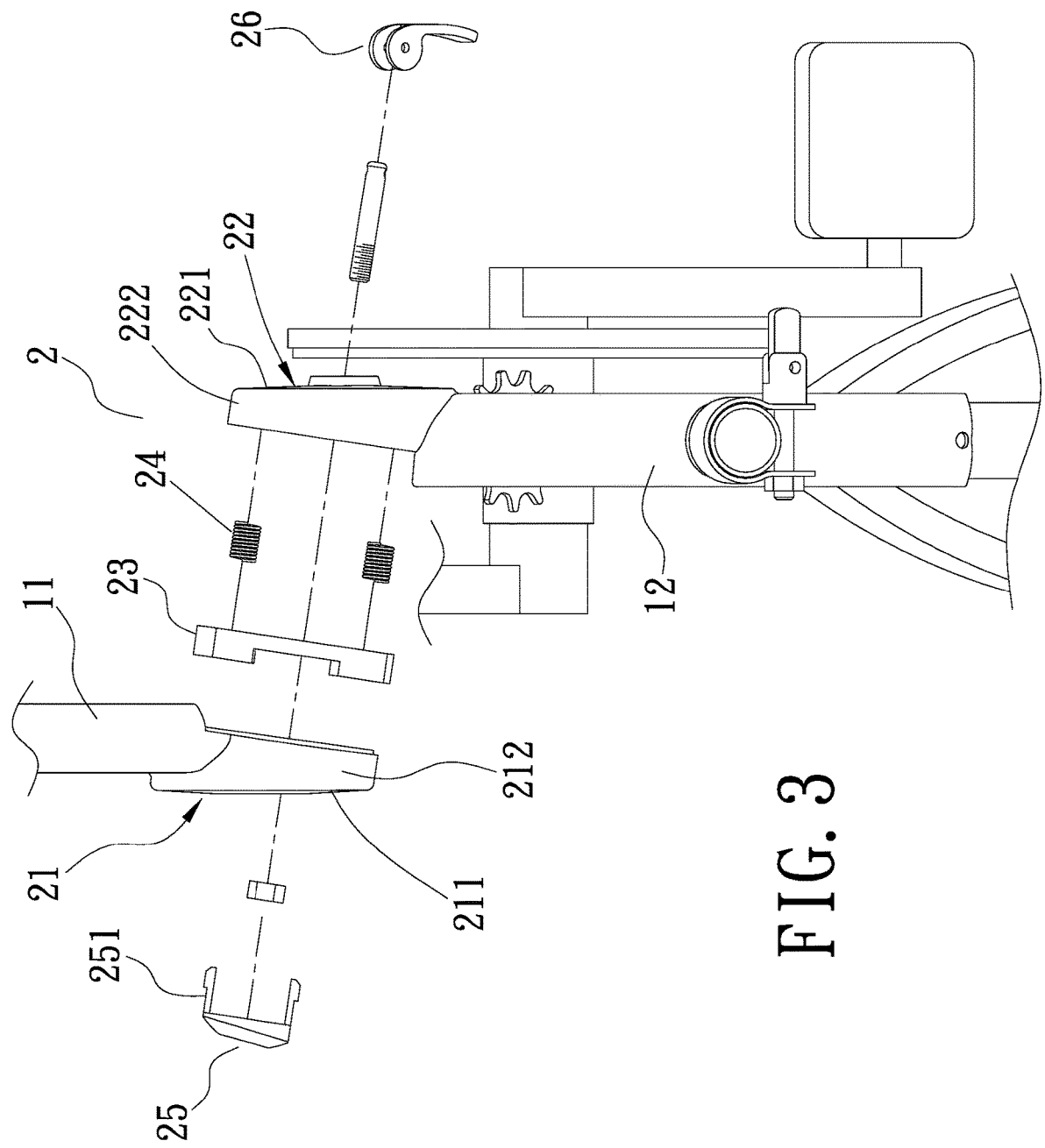
FIG. 3 is a top view showing the explosion diagram of the foldable bicycle according to the present invention.
Figure 4:
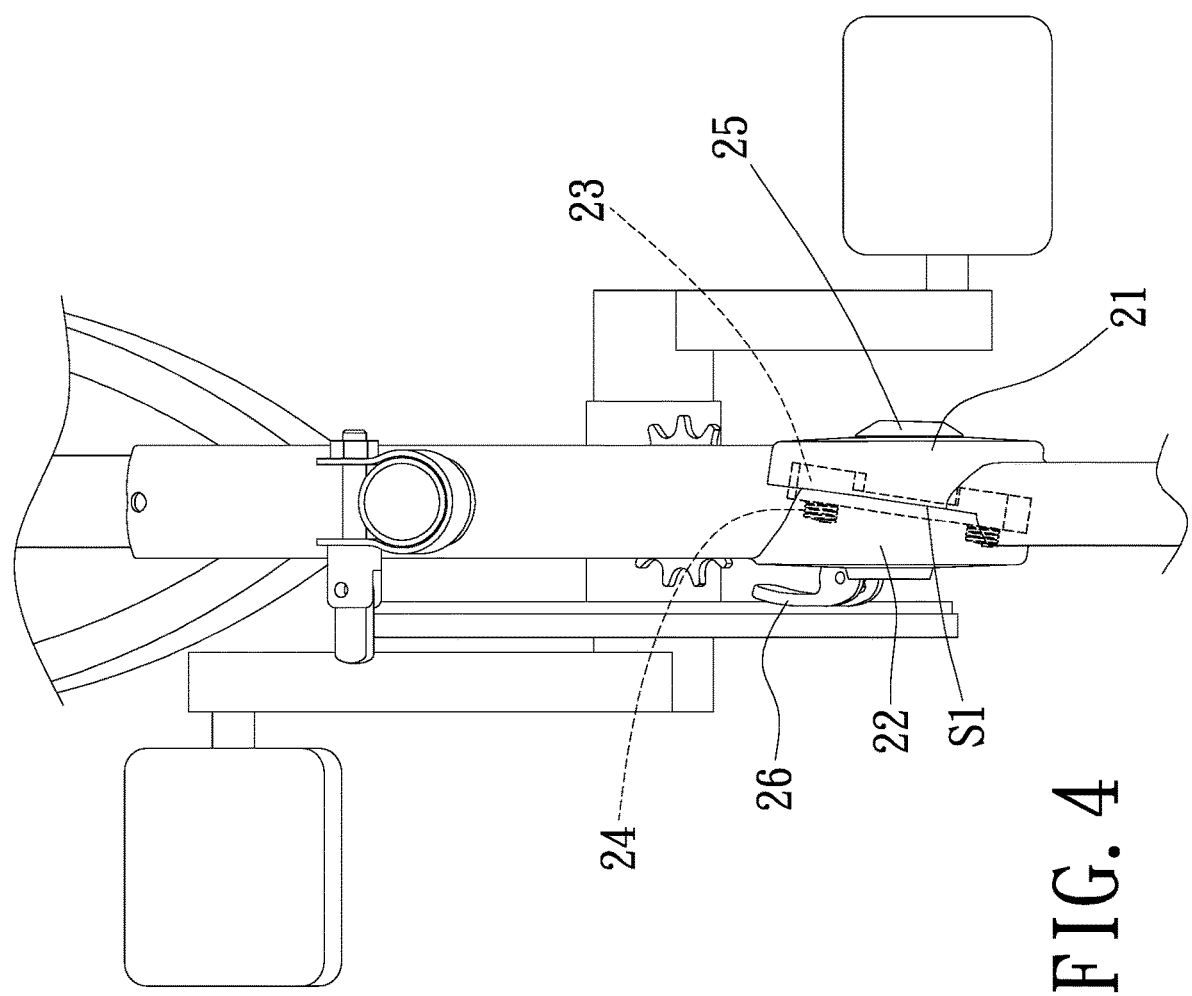
FIG. 4 is a top view showing a foldable bicycle in assembly according to the present invention.
Figure 5:
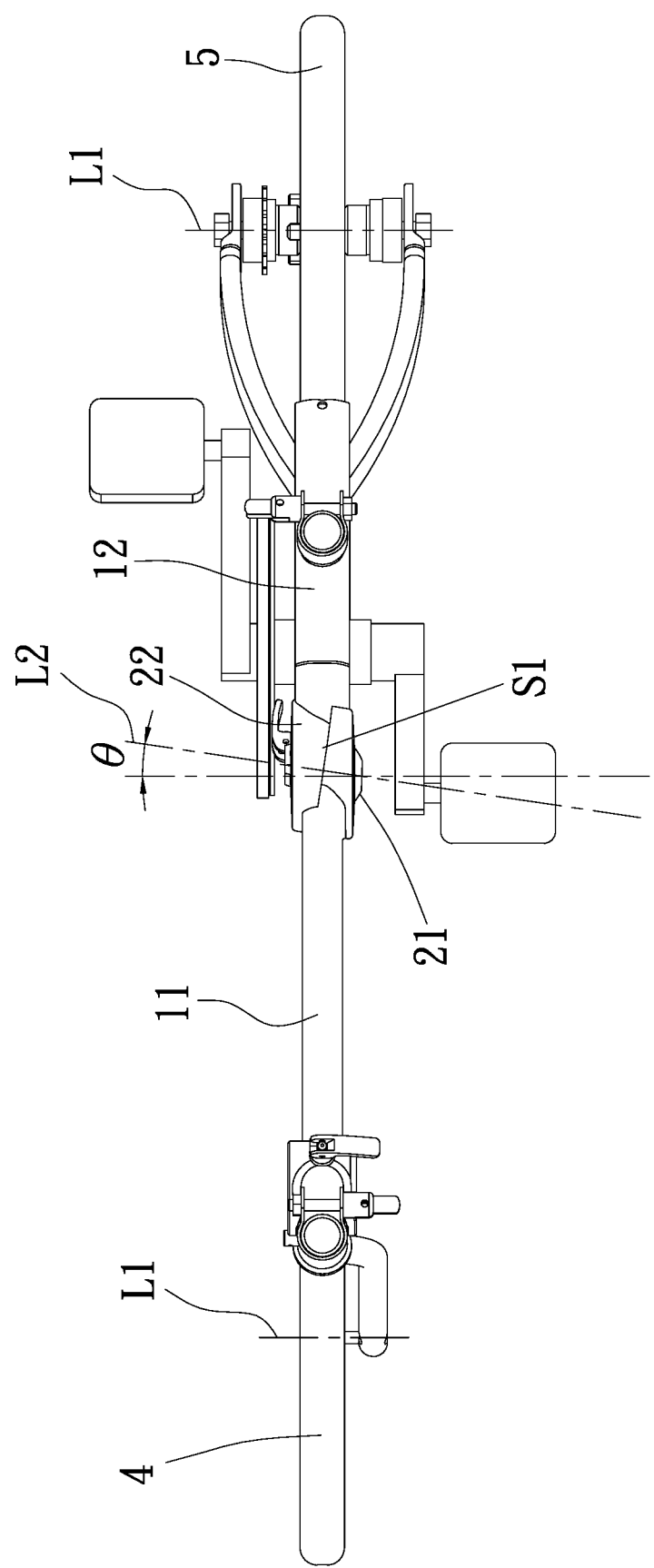
FIG. 5 is a top view showing a foldable bicycle in assembly according to the present invention.

Furthermore, an external surface of the first outer shell (21) is provided with a capacity tank (214) for accommodating the press button (25) and the perforation (213) disposed in the capacity tank (214) for insertion of the pushing lever (251) of the press button (25) as shown in FIG. 2.

What is claimed is:

1. A foldable bicycle, comprising:
a main frame having a first connecting rod and a second connecting rod;
a first folding joint between the first connecting rod and the second connecting rod and having a first outer shell connected to a rear end of the first connecting rod, a second outer shell connected to a front end of the second connecting rod for further connecting the first outer shell, an engaging unit accommodated in a space defined by the first outer shell and the second outer shell being joined together, an elastic member disposed between the engaging unit and the second outer shell, a press button having a pushing lever for inserting from an outside of the first outer shell to an interior of the first outer shell to contact the engaging unit, and a cam locking member for positioning the first outer shell, the engaging unit and the second outer shell coaxially in a first axial direction and for controlling tightness of coupling between the first outer shell and the second outer shell, wherein:
the first outer shell is formed by a first lateral wall and a first annular wall surrounding a periphery of the first lateral wall, the first annular wall having a first height and a second height,
the second outer shell is formed by a second lateral wall and a second annular wall surrounding a periphery of the second lateral wall, the second annular wall having a first height and a second height, and
the first height of the first annular wall correspondingly connects with the second height of the second annular wall, and the second height of the first annular wall correspondingly connects with the first height of the second annular wall to form an oblique junction between the first and second annular walls when the main frame is unfolded about the first folding joint;
a front wheel rack connected to a front end of the first connecting rod;
a front wheel connected to the front wheel rack and arranged in a second axial direction to an axis of the front wheel; and
a rear wheel connected to a rear end of the second connecting rod and arranged in the second axial direction to an axis of the rear wheel,
wherein the second axial direction is obliquely oriented relative to the first axial direction at an included angle, and the first and second connecting rods extend in longitudinal alignment relative to one another when the main frame is unfolded about the first folding joint.

2. The foldable bicycle as claimed in claim 1, wherein a second folding joint is provided on a top end of the front wheel rack and a handlebar stem is further connected with the second folding joint, so the handlebar stem is bent downwardly to lean against a lateral side of the front wheel rack as the second folding joint stays in an unlocking state.

3. A foldable bicycle, comprising:
   a main frame having a first connecting rod and a second connecting rod;
   a first folding joint between the first connecting rod and the second connecting rod and having a first outer shell connected to a rear end of the first connecting rod, a second outer shell connected to a front end of the second connecting rod for further connecting the first outer shell, an engaging unit accommodated in a space defined by the first outer shell and the second outer shell being joined together, an elastic member disposed between the engaging unit and the second outer shell, a press button having a pushing lever for inserting from an outside of the first outer shell to an interior of the first outer shell to contact the engaging unit, and a cam locking member for positioning the first outer shell, the engaging unit and the second outer shell coaxially in a first axial direction and for controlling tightness of coupling between the first outer shell and the second outer shell, wherein the first outer shell is formed by a first lateral wall and a first annular wall surrounding a periphery of the first lateral wall, the first annular wall having a first height and a second height, and the second outer shell is formed by a second lateral wall and a second annular wall surrounding a periphery of the second lateral wall, the second annular wall having a first height and a second height, and wherein the first height of the first annular wall correspondingly connects with the second height of the second annular wall, and the second height of the first annular wall correspondingly connects with the first height of the second annular wall to form an oblique junction between the first and second annular walls;
   a front wheel rack connected to a front end of the first connecting rod;
   a front wheel connected to the front wheel rack and arranged in a second axial direction to an axis of the front wheel; and
   a rear wheel connected to a rear end of the second connecting rod and arranged in the second axial direction to an axis of the rear wheel, wherein the second axial direction is obliquely oriented relative to the first axial direction at an included angle;
   wherein an external surface of the first outer shell is provided with a capacity tank for accommodating the press button and a perforation disposed in the capacity tank for insertion of the pushing lever of the press button.

4. The foldable bicycle as claimed in claim 3, wherein a second folding joint is provided on a top end of the front wheel rack and a handlebar stem is further connected with the second folding joint, so the handlebar stem is bent downwardly to lean against a lateral side of the front wheel rack as the second folding joint stays in an unlocking state.

5. A method for folding a foldable bicycle, comprising:
   establishing a foldable bicycle including:
      a main frame having a first connecting rod and a second connecting rod;
      a first folding joint between the first connecting rod and the second connecting rod and having a first outer shell connected to a rear end of the first connecting rod, a second outer shell connected to a front end of the second connecting rod for further connecting the first outer shell, an engaging unit accommodated in a space defined by the first outer shell and the second outer shell being joined together, an elastic member disposed between the engaging unit and the second outer shell, a press button having a pushing lever for inserting from an outside of the first outer shell to an interior of the first outer shell to contact the engaging unit, and a cam locking member for positioning the first outer shell, the engaging unit and the second outer shell coaxially in a first axial direction and for controlling tightness of coupling between the first outer shell and the second outer shell, wherein:
         the first outer shell is formed by a first lateral wall and a first annular wall surrounding a periphery of the first lateral wall, the first annular wall having a first height and a second height,
         the second outer shell is formed by a second lateral wall and a second annular wall surrounding a periphery of the second lateral wall, the second annular wall having a first height and a second height, and
         the first height of the first annular wall correspondingly connects with the second height of the second annular wall, and the second height of the first annular wall correspondingly connects with the first height of the second annular wall to form an oblique junction between the first and second annular walls when the main frame is unfolded about the first folding joint;
      a front wheel rack connected to a front end of the first connecting rod;
      a front wheel connected to the front wheel rack and arranged in a second axial direction to an axis of the front wheel; and
      a rear wheel connected to a rear end of the second connecting rod and arranged in the second axial direction to an axis of the rear wheel,
      wherein the second axial direction is obliquely oriented relative to the first axial direction at an included angle, and the first and second connecting rods extend in longitudinal alignment relative to one another when the main frame is unfolded about the first folding joint;
   unlocking the first folding joint fitted on the main frame between the front wheel and the rear wheel;
   rotating the first folding joint in the first axial direction to form the included angle between the first axial direction and the second axial direction obliquely oriented relative to the first axial direction, wherein the second axial direction is parallel to axes of the front and rear wheels; and
   folding the main frame by the first folding joint to make the front and rear wheels parallel to each other.

6. The method for folding a foldable bicycle as claimed in claim 5, further comprising downwardly bending a handlebar stem about an axis of a folding shaft part of a second folding joint by unlocking the second folding joint fitted between the front wheel rack and the handlebar stem, wherein the handlebar stem is connected with the second folding joint pivoted on a top end of the front wheel rack.

7. The method for folding a foldable bicycle as claimed in claim 6, further comprising rotating the front wheel rack about an axis of a connection between a front end of the main frame and the front wheel rack to align the front wheel rack with a forward to backward direction before folding the main frame.

8. The method for folding a foldable bicycle as claimed in claim 5, further comprising rotating the front wheel rack about an axis of a connection between a front end of the main frame and the front wheel rack to align the front wheel rack with a forward to backward direction before folding the main frame.

* * * * *